US012715747B2

(12) United States Patent
Guy et al.

(10) Patent No.: US 12,715,747 B2
(45) Date of Patent: Aug. 25, 2026

(54) TOOL FOR SEIZING AND EJECTING CLOSURE PLUGS FOR TUBES RECEIVING SAMPLES TO BE ANALYSED, AND USE OF SUCH A TOOL

(71) Applicant: BIOMÉRIEUX, Marcy l'Etoile (FR)

(72) Inventors: Michel Guy, Grenoble (FR); Nicolas Delepaut, Grenoble (FR); Edgar Minassian, Lentilly (FR)

(73) Assignee: BIOMÉRIEUX, Marcy l'Etoile (FR)

( * ) Notice: Subject to any disclaimer, the term of this patent is extended or adjusted under 35 U.S.C. 154(b) by 590 days.

(21) Appl. No.: 18/000,829

(22) PCT Filed: Jun. 11, 2021

(86) PCT No.: PCT/FR2021/051048
§ 371 (c)(1),
(2) Date: Dec. 6, 2022

(87) PCT Pub. No.: WO2021/250359
PCT Pub. Date: Dec. 16, 2021

(65) Prior Publication Data

US 2023/0219797 A1 Jul. 13, 2023

(30) Foreign Application Priority Data

Jun. 12, 2020 (FR) ...................................... 2006168

(51) Int. Cl.
*B67B 7/10* (2006.01)

(52) U.S. Cl.
CPC ...................................... *B67B 7/10* (2013.01)

(58) Field of Classification Search
CPC .... B67B 7/02; B67B 7/10; B67B 7/00; B67B 7/15; B67B 7/06; B67B 7/04;
(Continued)

(56) References Cited

U.S. PATENT DOCUMENTS 3,787,946 A * 1/1974 Schimek ................ B25B 27/02
81/3.47
5,692,789 A * 12/1997 Woodsum ................ B25B 9/00
81/3.43
(Continued)

FOREIGN PATENT DOCUMENTS

EP 2 390 223 A1 11/2011
WO WO-2013019912 A1 * 2/2013 .......... B01L 3/50853

OTHER PUBLICATIONS

PE2E Translation WO-2013019912; Bartholomew, Cheryl; Cap Handling Tools and Method of Use; Feb. 7, 2013 (Year: 2013).*
(Continued)

*Primary Examiner* — Brian D Keller
*Assistant Examiner* — Sidney D Full
(74) *Attorney, Agent, or Firm* — Oliff PLC

(57) ABSTRACT

The subject of the invention relates to a tool for manipulating a plurality of plugs, taking the form of a comb (1) comprising:

a body (7) provided with a row of teeth (4) having pointed distal portions (4*p*) spaced apart in a linear direction in order to engage with the cavities of the plugs;

a system for separating the plugs from the teeth (4) that comprises a slide returned elastically and guided to slide with respect to the body (7) in a direction parallel to the direction of extension of the teeth, the slide being provided with the fingers of the comb, which are movable by sliding between the teeth (4), and a control (11*a*) accessible from a first portion (1*a*) of the comb and which, when pressed to move translationally, causes the fingers of the comb to slide in the direction of the pointed distal portions (4*p*) in order to eject the plugs from the teeth (4).

10 Claims, 6 Drawing Sheets

(58) Field of Classification Search
CPC ............... H01H 85/0208; B01L 3/5085; B01L 3/50825; B01L 3/50853; B01L 3/0275; B01L 99/00; B01L 2300/042
USPC ...... 81/3.8, 3.09, 3.08, 3.4, 3.55, 3.14, 3.44, 81/3.57, 3.47, 3.56
See application file for complete search history.

(56) References Cited

U.S. PATENT DOCUMENTS

| | | | | |
|---|---|---|---|---|
| 6,109,139 | A | 8/2000 | Regester et al. | |
| 9,038,503 | B2 * | 5/2015 | Bartholomew ......... | B67B 1/045 81/3.47 |
| 2011/0289889 | A1 * | 12/2011 | Kohanski ............ | B01L 3/50853 81/3.4 |

OTHER PUBLICATIONS

International Search Report, dated Sep. 24, 2021, corresponding to International Application No. PCT/FR2021/051048.

* cited by examiner

[Fig. 1]
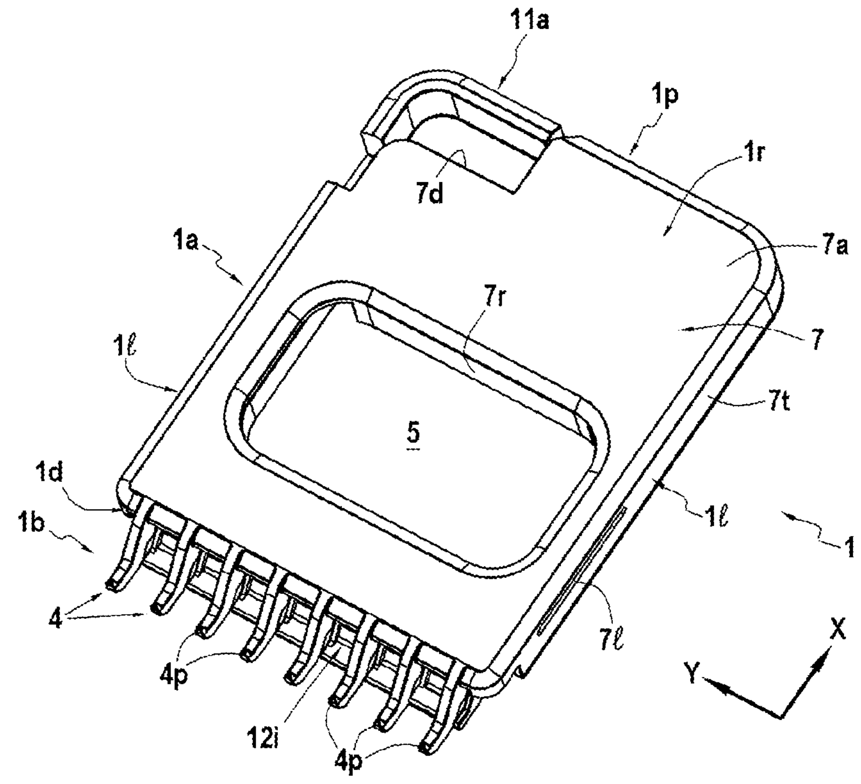
[Fig. 2]
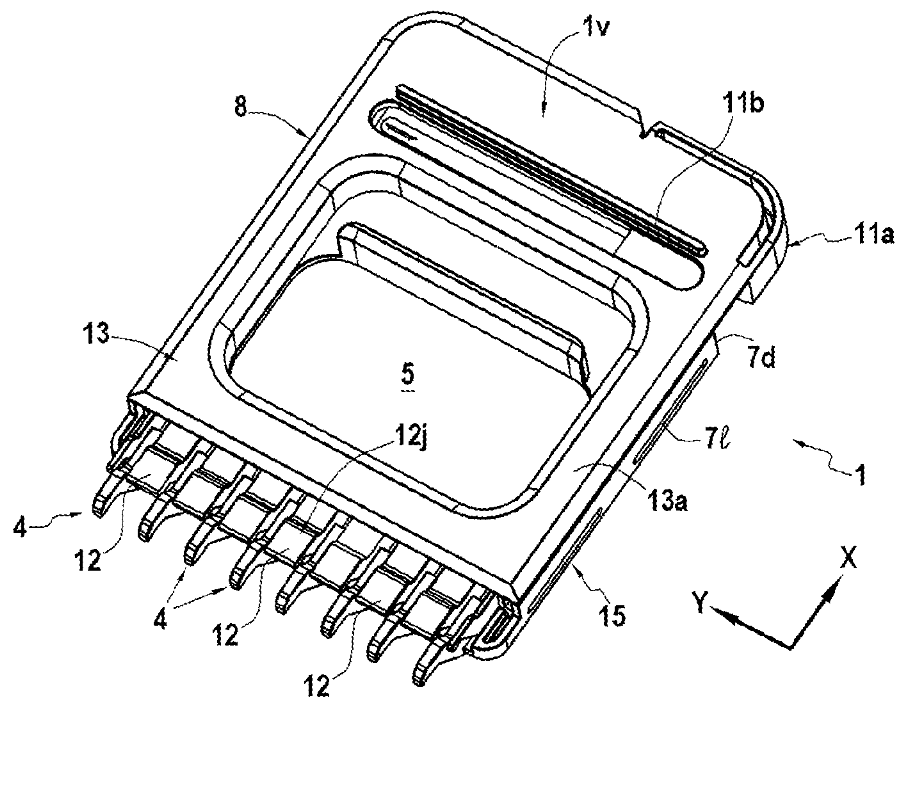

[Fig. 3]
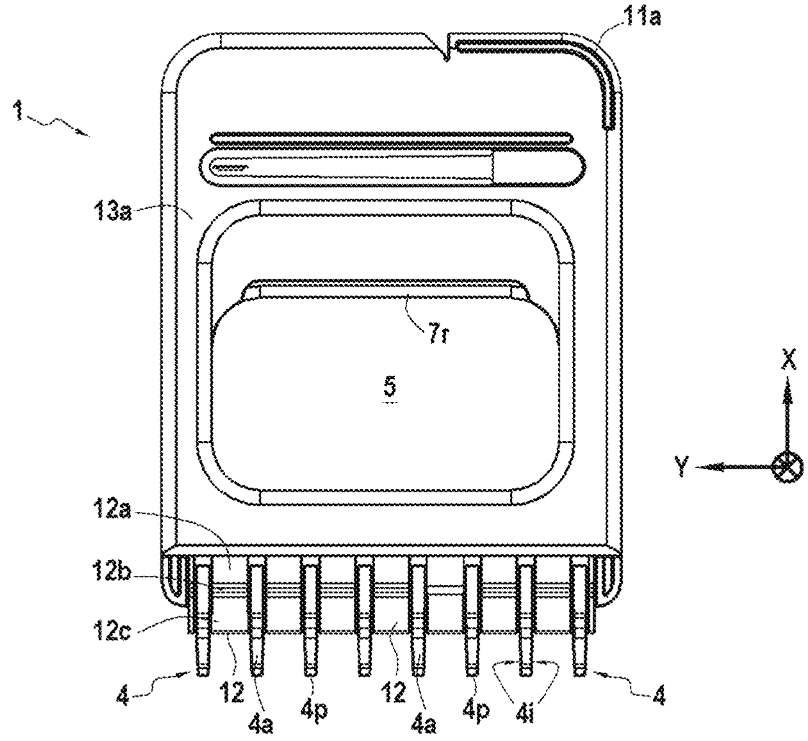

[Fig. 4]
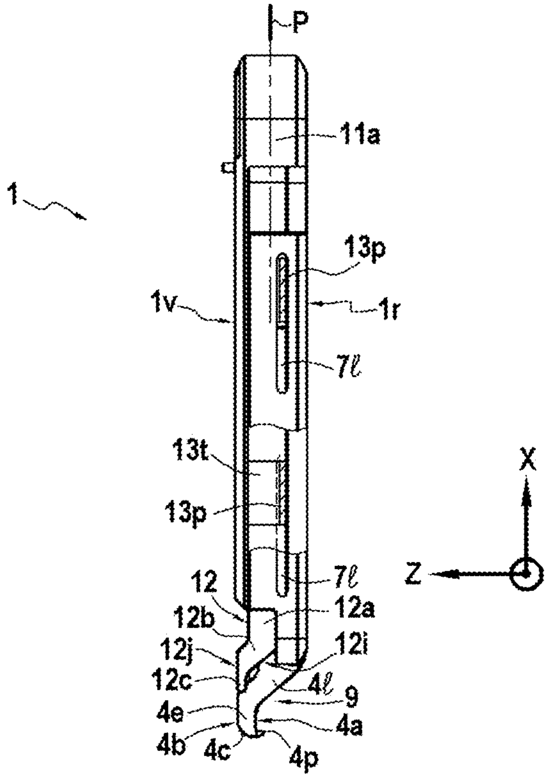

[Fig. 5]
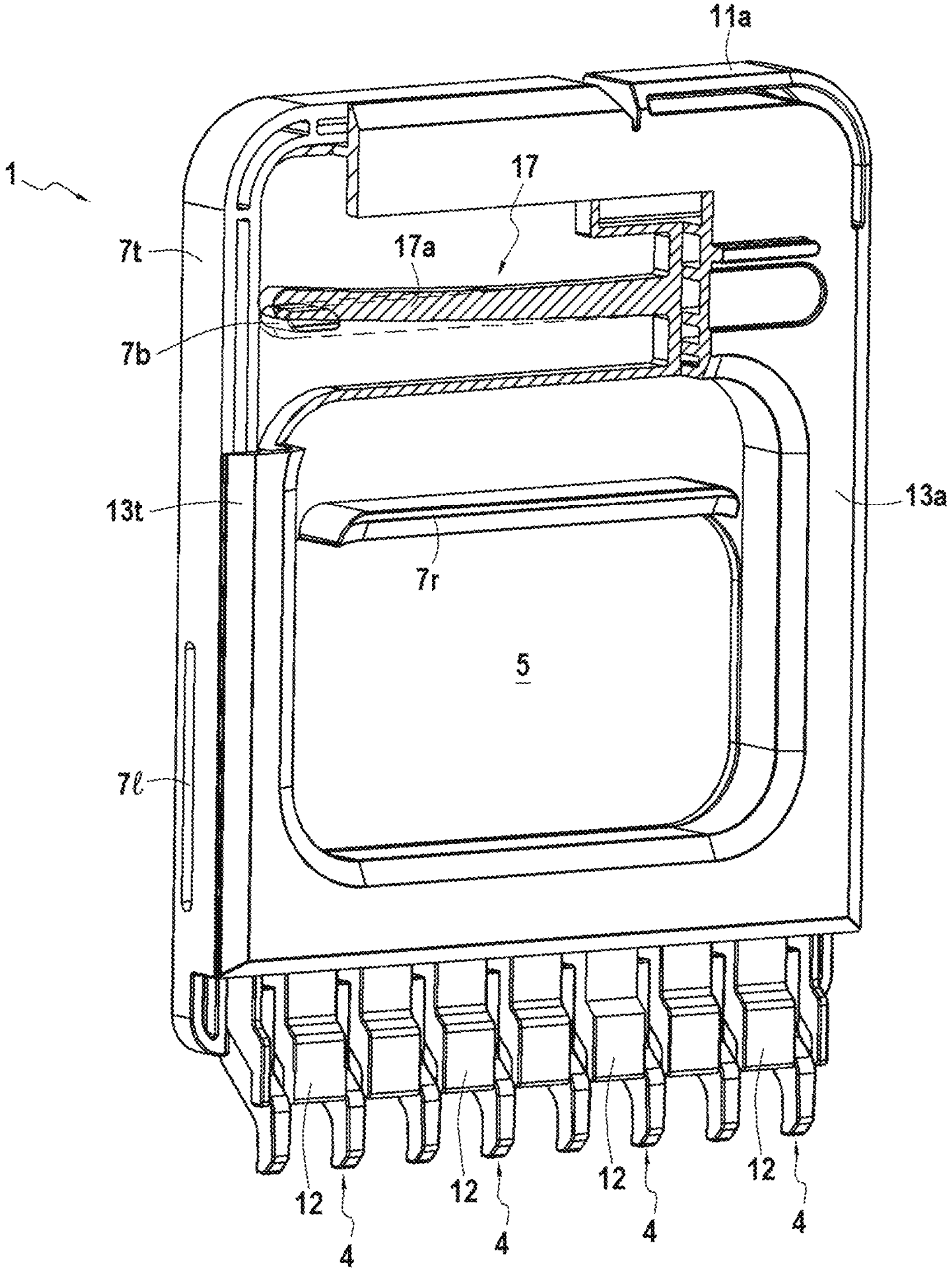

[Fig. 6]
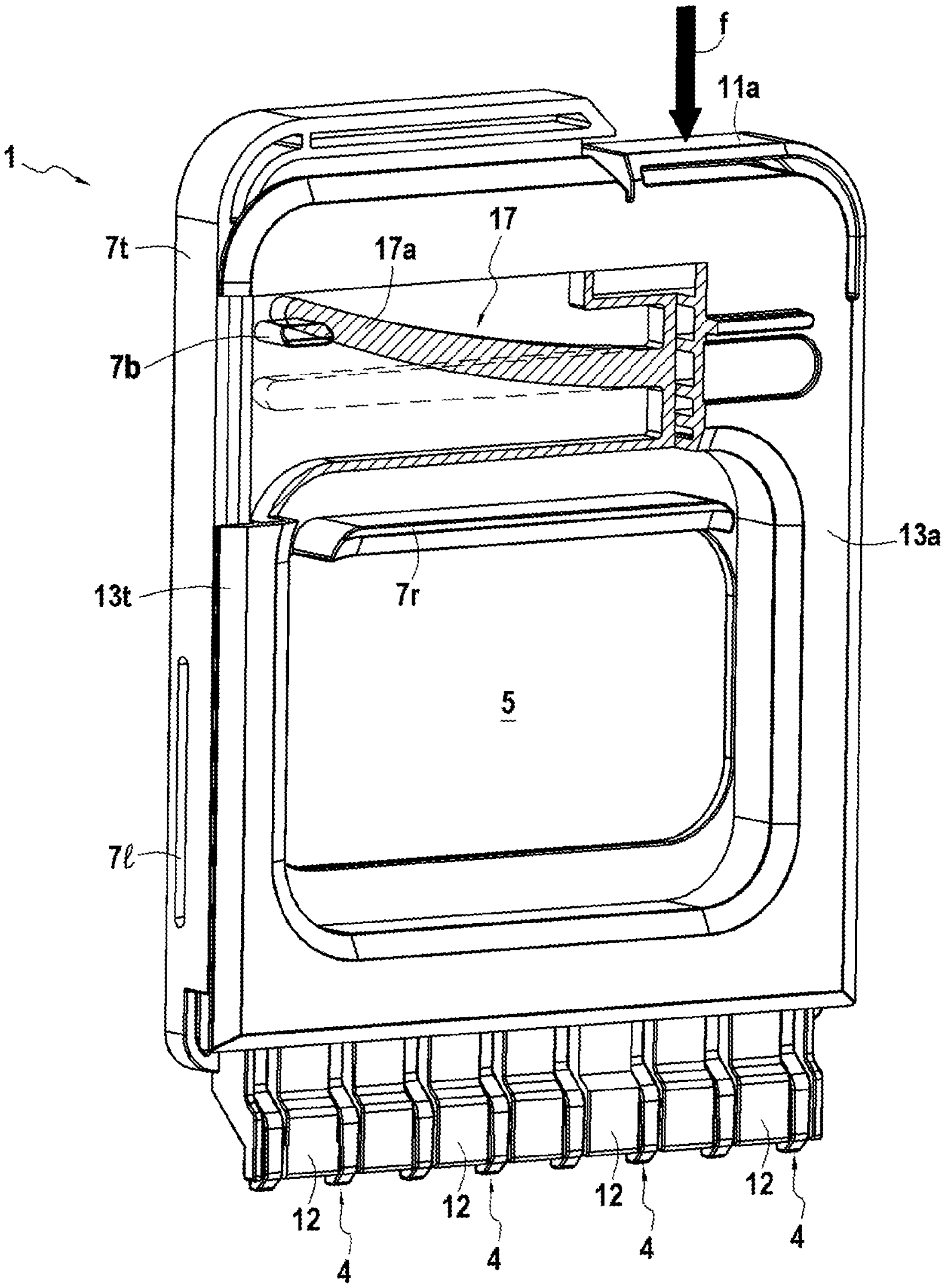

[Fig. 7A-7E]
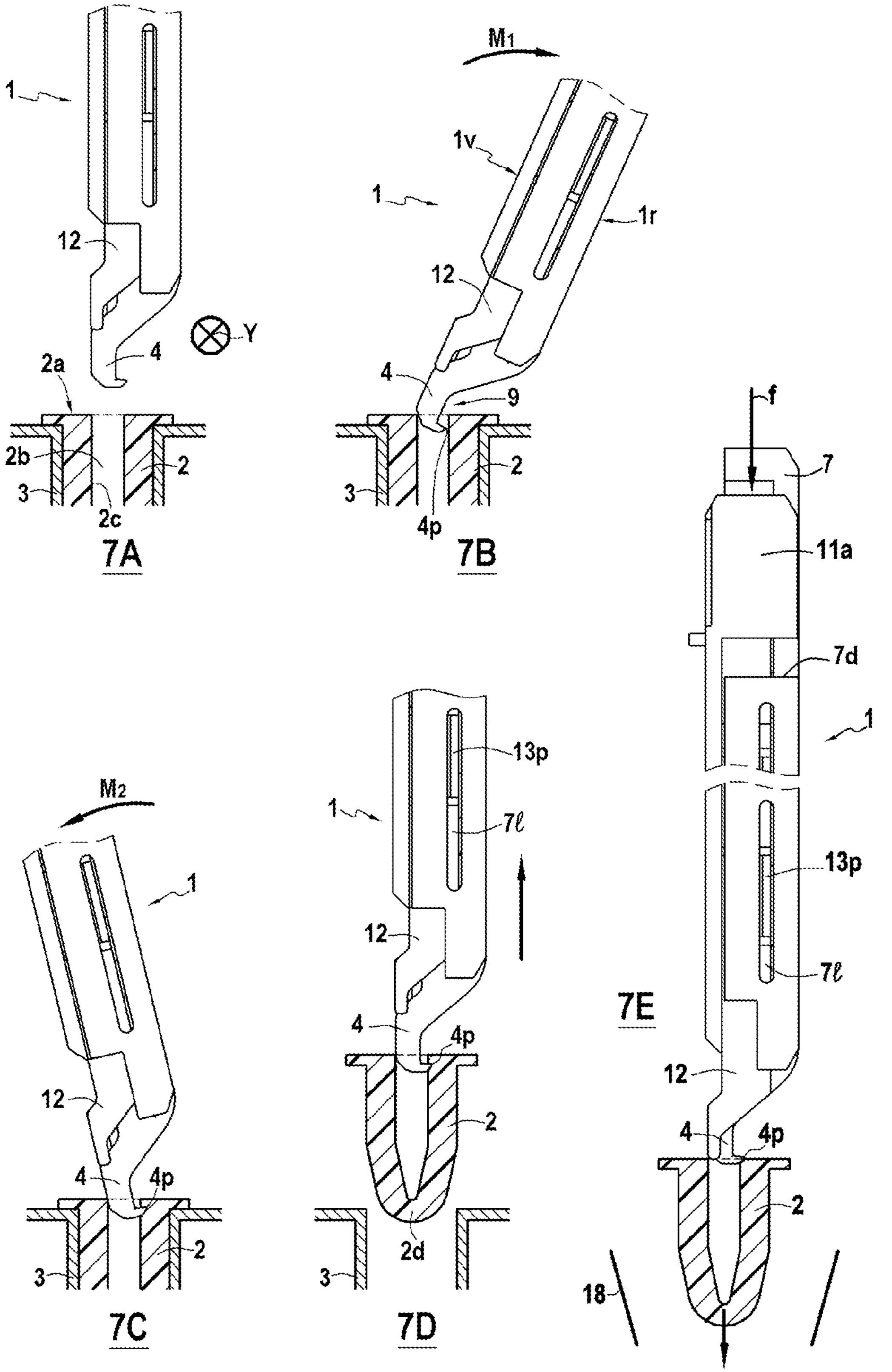

TOOL FOR SEIZING AND EJECTING CLOSURE PLUGS FOR TUBES RECEIVING SAMPLES TO BE ANALYSED, AND USE OF SUCH A TOOL

TECHNICAL FIELD

The present invention relates to the technical field of tools for manipulating plugs sealing tubes receiving samples of chemical or biological solutions to be analyzed.

The tool in accordance with the invention finds particularly advantageous applications for manipulating plugs sealing tubes receiving samples of chemical or biological solutions to be analyzed and used in the context of processes carrying out a polymerase chain reaction ("PCR") and similar methods.

PRIOR ART

The prior art has proposed numerous solutions for manipulating the plugs equipping tubes for receiving a chemical or biological solution to be analyzed.

Patent application WO 13019912 describes a tool for manipulating a plurality of plugs closing tubes spaced apart and arranged in a linear manner. These plugs have an upper surface with a cavity. The tool takes the form of a comb comprising a body having a first portion for gripping by an operator's hand and a second portion for taking the plugs. This second portion comprises a plurality of projecting fingers spaced apart and aligned in a linear manner along an axis of rotation. The fingers are provided with projecting portions engaging with the cavities of the plugs in order to disengage the plugs from the tubes by a pivoting movement of the tool around the axis of rotation. Such a tool is simple in design and allows to simultaneously unplug a series of tubes, then optionally to reintroduce the plugs into the tubes. However, in some applications these plugs must be separated from the tool fingers for disposal. However, this operation is relatively long and delicate to carry out and has risks of contamination for the operator.

Patent EP 2 390 223 describes a portable device for plugging and unplugging a plurality of receptacles with plugs, each having an upper surface with a cavity. This device comprises a portable case extended by a handle to be seized by the hand of an operator. This case contains a motorized rotation drive system for a set of pins projecting from the casing to each engage by friction with a cavity of the plug. This motorized system simultaneously rotates each pin in opposite directions to plug and unplug the plurality of receptacles.

This device also comprises an ejection plate configured to separate the plurality of plugs from all the pins. To this end, the handle has a trigger moving a pull-out slide engaging with a plate via inclined surfaces transforming the translational movement of the trigger into a sliding movement of the plate in a perpendicular direction which is parallel to the direction of extension of the pins. The sliding plate is mounted integral with the ejection plate which comprises apertures each traversed by a pin. The sliding of the ejection plate towards the distal end of the pins allows to separate the plugs from the pins.

Such a device is specifically adapted to plug and unplug a plurality of receptacles with screwed plugs. In addition, such a device has a complex and expensive design.

Patent U.S. Pat. No. 6,109,139 describes a tool for unplugging a plurality of linearly spaced tubes. Each tube is closed by a cap having an upper surface comprising a cavity.

This tool comprises a body having a first portion for handling by an operator, taking the form of a plate having two main faces extending on either side of a main plane. This body has a second portion located in a coplanar relationship with said first portion and adapted to take or seize the plurality of caps. This second portion comprises a row of fixed pegs projecting from said body and linearly spaced apart to be aligned with said caps. The pegs are adapted to engage by friction with the cavities of the caps. By a tilting movement of the tool, the caps are removed from the tubes using the pegs. This tool also comprises a separation system configured to separate the plurality of plugs from the fixed pegs. This separation system comprises a plate surrounding by fingers, the pegs on three of their sides. The plate is biased against the second portion of the body using springs. This plate extends on the side of one face of the body by a rim on which the application of pressure leads to the pivoting of the plate causing the fingers to move outwards and in the direction of the distal ends of the pegs, thus facilitating removing the caps from the fingers.

Such a tool is particularly adapted for easily unplugging and re-plugging tubes with plugs without affecting the content of these tubes. Such a tool is not adapted for discarding plugs into a waste container, without the risk of contamination for the operator. Indeed, the actuation rim of the plate is located close to the pegs, leading to a risk of contamination for the operator. Moreover, the pivoting movement of the plate facilitates the separation of the plugs from the fingers during the operation of re-plugging the tubes but does not ensure safe and complete separation of the plugs from the pegs. In addition, the use of this tool requires both hands of the operator and has a difficulty in holding the tubes at the same time as the tool.

DISCLOSURE OF THE INVENTION

The present invention aims at overcoming the disadvantages of the prior art by proposing a tool which is simple in design for seizing plugs sealing tubes receiving samples of chemical or biological solutions to be analyzed, but also for completely and safely separating the plugs from the tool, without risk of contamination for the operator.

To achieve such an objective, the subject of the invention relates to a tool for manipulating a plurality of plugs spaced apart and arranged in a linear manner, each having an upper surface with a cavity, the tool taking the form of a comb having two main faces extending on either side of a main plane and having a first portion for handling by an operator and a second portion for taking the plugs when applying to the first portion, a pivoting movement perpendicular to the main plane, this tool comprising:

- a body provided with a row of teeth projecting from the second portion of the comb in directions of extension parallel to each other and spaced apart in a linear direction in order to engage with the cavities of the plugs;
- a system for separating the plugs from the teeth comprising a control for moving the fingers of the comb engaged between the teeth.

According to the invention:

- the teeth have pointed distal portions oriented in directions substantially perpendicular to the main plane of the comb so as to engage in the plugs during the pivoting movement;
- the separation system comprises a slide returned elastically and guided to slide with respect to the body in a direction parallel to the direction of extension of the teeth, the slide being provided with the fingers of the comb, which are movable by sliding between the teeth and the control accessible from the first portion of the comb and which, when pressed to move translationally, causes the fingers of the comb to slide in the direction of the pointed distal portions in order to eject the plugs from the teeth.

In addition, the tool according to the invention may further comprise in combination at least one and/or the other of the following additional characteristics:

- the first portion of the comb comprises an aperture which opens onto the two main faces, this aperture being arranged at a distance from a proximal side of the first portion of the comb to ensure the passage of the operator's fingers for gripping the tool;
- the control of the slide is located between the aperture and the proximal side of the first portion of the comb;
- the control of the slide is accessible from the proximal side of the first portion of the comb;
- the first portion of the comb has a rectangular shape, being delimited by two lateral sides connected to the proximal side, the control of the slide being located in a corner of the proximal side;
- the body takes the form of a plate externally delimiting a main face of the comb and slidably guiding the slide made in the form of a plate externally delimiting the other main face of the comb;
- the body is provided with a flexibly deformable blade, the end of which is supported on the slide so that the slide is biased by a return force during its sliding travel;
- the pointed distal portion of each tooth is connected to the body by a connecting segment delimiting a clearance space for the engagement of the pointed distal portions in the plugs;
- the pointed distal portion of each tooth has a rear face extending coplanarly with the rear face of the fingers of the comb.

Another subject of the invention is to propose a use of such a tool allowing to simplify and secure the operations of removing the plugs sealing the tubes receiving samples of chemical or biological solutions to be analyzed, but also the operations to discard such plugs.

To achieve such an objective, the subject of the invention relates to the use of a tool for manipulating a plurality of plugs consisting in:

- providing at least a series of tubes spaced apart and arranged in a linear manner and each closed by a plug having an upper surface with a cavity;
- providing a tool taking the form of a comb having two main faces extending on either side of a main plane and having a first portion for handling by an operator and a second portion for taking the plugs, this tool comprising a body provided with a row of teeth projecting from the second portion of the comb in directions 20 of extension parallel to each other while being spaced apart in a linear direction in order to engage with the cavities of the plugs and having pointed distal portions oriented in directions substantially perpendicular to the main plane of the body, the tool comprising a system for separating the plugs from the teeth that comprises a slide returned elastically and guided to slide with respect to the body in a direction parallel to the direction of extension of the teeth, the slide being provided with fingers which are movable by sliding between the teeth and a control accessible from the first portion of the body and which, when pressed to move translationally, causes the fingers of the slide to slide in the direction of the pointed distal portions;
- taking the comb by its first portion with one hand;
- engaging the teeth inside the cavities of the plugs to ensure that the plugs are taken by the pointed distal portions of the teeth;
- applying a pivoting movement to the comb in a direction perpendicular to the main plane to release the plugs from the tubes;
- and ensuring by at least one finger of the operator, a support in translation on the control of the slide in order to eject the plugs from the teeth.

According to a variant of use, the first portion of the comb is taken by the hand of the operator whose fingers are engaged through an aperture made in the comb. According to another variant of use, the thumb of the operator's hand provides translational support on the control of the slide.

BRIEF DESCRIPTION OF THE DRAWINGS

FIG. 1 is a perspective view from the recto face of an embodiment of the tool in accordance with the invention.

FIG. 2 is a perspective view of the back face of the tool in accordance with the invention illustrated in FIG. 1.

FIG. 3 is a plan view of the back face of the tool in accordance with the invention.

FIG. 4 is a side view of the tool in accordance with the invention.

FIG. 5 is a partially cut-away perspective view showing the tool in a first position of use.

FIG. 6 is a perspective view similar to FIG. 5 but showing the tool in a second position of use.

FIGS. 7A to 7E are side views of the tool in accordance with the invention in different positions during use, namely presentation, seizure of the plug, removal of the plug, extraction of the plug from the tube and separation of the plug from the tool.

DESCRIPTION OF EMBODIMENTS

As shown in the drawings, the subject of the invention relates to a tool 1 intended to be used by an operator to simultaneously manipulate a plurality of plugs 2 each sealing a tube 3 for receiving a chemical or biological solution to be analyzed. Each plug 2 has an upper surface 2*a* in which opens a cavity 2*b* delimited by a cylindrical wall 2*c* rising from a bottom 2*d* optionally provided with an insertion slot for a pipette. Typically, the plugs 2 are made of a rubber type material.

Conventionally, the tubes 3 are positioned in a support being spaced apart and arranged in rows or lines parallel to each other so that the plugs 2 sealing such tubes 3 are also positioned with a determined spacing pitch, according to rows or lines parallel to each other. The tool 1 according to the invention is adapted for manipulating a plurality of plugs 2 spaced apart and arranged in a linear manner on a series of tubes 3.

The tool 1 in accordance with the invention is a flat tool in the form of a comb provided with a row of teeth 4 adapted to each engage with a plug 2. In the example illustrated in the drawings, the tool 1 comprises eight aligned teeth 4 so that it can simultaneously manipulate from one to eight plugs 2 but it is clear that the tool 1 can be manufactured to comprise a different number of teeth 4.

This comb 1 has two main faces, namely a recto face 1*r* and a back face 1*v* extending on either side of a main plane P. This comb 1 has a first portion 1*a* for handling by an operator and a second portion 1*b* for seizing the plugs 2 when applying to the first portion, a pivoting movement perpendicular to the main plane P as will be explained in detail in the following description. The first portion 1*a* of the tool is dimensioned so that an operator's hand can seize and manipulate the tool so that this first portion 1*a* has a much larger surface than the second portion 1*b* which is limited to the area in which the teeth 4 are located.

According to an advantageous variant embodiment illustrated in the drawings, the first portion 1*a* of the comb 1 has a generally rectangular shape defined with respect to a main direction X and to a transverse direction Y perpendicular to the main direction X, the main X and transverse Y directions being taken in a plane parallel to the main plane P and perpendicular to a lateral direction Z along which the thickness of the comb is defined. The first portion 1*a* of the comb 1 is delimited by two lateral sides 1*l* parallel to each other and to the main direction X. These two lateral sides 1*l* are connected to a proximal side 1*p* and, on the opposite side, to a distal side 1*d* from which extends the second portion of the comb 1*b*. The proximal side 1*p* and the distal side 1*d* are parallel to each other and to the transverse direction Y.

According to an advantageous variant embodiment illustrated in the drawings, the first portion 1*a* of the comb 1 comprises an aperture 5 opening onto the two main faces 1*r*, 1*v*, and dimensioned to allow the passage of the operator's fingers for gripping of the tool. In the example illustrated, the aperture 5 has a rectangular shape with a dimension in the transverse direction Y adapted to ensure the passage of the fingers of the operator and in particular, the positioning side by side of the four fingers of the operator except for the thumb. This aperture 5 is arranged at a distance from the proximal side 1*p* so that the first portion 1*a* of the comb located between this aperture 5 and the proximal side 1*p* can be supported, on the back face 1*v* with the palm of the hand and, on the recto face, with the four folded fingers of the operator's hand. In this position for seizing the comb, it should be noted that the proximal side 1*p* is supported on the palm of the hand ensuring good gripping of the comb.

According to another variant embodiment not shown, the comb 1 does not comprise the aperture 5. According to this variant, the thumb of the operator is supported on the recto face 1*r* of the comb while the other four fingers of the operator's hand are supported on the back face 1*v*, considering that the proximal side 1*p* can be supported on the palm of the hand. It should be noted that this position for seizing the comb can be used even for the comb provided with the aperture 5. In this case, the thumb is supported on the recto face 1*r* of the first portion 1*a* of the comb located between the aperture 5 and the proximal side 1*p* while the other four fingers of the hand are supported on the back face 1*v* of this first portion 1*a* of the comb located between the aperture 5 and the proximal side 1*p*.

According to a characteristic of the invention, the comb 1 comprises a body 7 provided with teeth 4. According to the embodiment illustrated in the drawings, the body 7 takes the form of a flat plate 7*a* forming the first portion 1*a* of the comb. This plate 7*a* delimits by its external face, a main face of the comb, namely the recto face 1*r*. The plate 7*a* is provided with a stretch-flange 7*t* extending along the two lateral sides 1*l* and the proximal side 1*p* of the comb.

This body 7 is provided with a row of teeth 4 projecting into the second portion 1*b* of the comb in directions of extension parallel to each other and to the main direction X. The plate 7*a* is therefore extended opposite to its proximal side 1*p*, by the teeth 4 positioned from the distal side 1*d* of the plate, in a linear direction parallel to the transverse direction Y. The teeth 4 are regularly spaced in a linear direction parallel to the transverse direction Y to engage with the cavities 2*b* of the plugs 2.

It should be noted that the plate 7*a* also has a hole delimiting the aperture 5 of the comb and whose proximal edge located closest to and parallel to the proximal side 1*p* is provided with a support edge 7*r* extending at right angle in relation to the plate. When the fingers of the operator are engaged through the aperture 5, the comb 1 is taken by one hand of the operator between the support edge 7*r* and the proximal side 1*p*.

According to a characteristic of the invention, the teeth 4 have pointed distal portions 4*p* oriented in directions substantially perpendicular to the main plane P of the body so as to engage in the plugs 2 and more precisely in the cylindrical wall 2*c* delimiting the cavities 2*b* of the plugs. The pointed distal portions 4*p* are oriented to be located on the same side as a main face of the comb, namely the recto face 1*r* in the example shown.

In other words, the teeth 4 each have a front face 4*a* and on the opposite side, a rear face 4*b* facing the same side respectively as the recto face 1*r* and the back face 1*v*. The front face 4*a* and the rear face 4*b* of each tooth 4 are connected by flat lateral faces 4*i* parallel to each other and to the main direction X. The pointed distal portions 4*p* thus rise projecting from the front faces 4*a* of the teeth. Each pointed distal portion 4*p* is adapted to penetrate or be anchored in the material of the plug 2 so that the plug 2 is secured to the tooth 4. Thus, the pointed distal portion 4*p* and the plug 2 are made of materials the hardness of which is adapted to allow penetration of the plug by the pointed distal portion 4*p* leading to a connection by obstacle between the plug 2 and the tooth 4. The pointed distal portions 4*p* are produced in any appropriate manner by one or more points, barbs, claws or hooks for example, arranged projecting from the front faces 4*a*, at the distal end of the teeth 4.

According to an advantageous variant embodiment, the pointed distal portion 4*p* of each tooth 4 is connected to the body 7 by a connecting segment 4*l* so as to delimit a clearance space 9 to facilitate the engagement of the pointed distal portions 4*p* in the plugs 2. This clearance space 9 or chamfer thus serves to release the teeth 4 during insertion in the plug 2. As emerges more precisely from FIG. 4, each tooth 4 comprises a connecting segment 4*l* starting from the plate 7*a* in the opposite direction of the recto face 1*r* so that the pointed distal portion 4*p* is set back with respect to the recto face 1*r*. Thus, in the lateral direction Z perpendicular to the main plane P, the pointed distal portions 7*p* are offset with respect to the recto face 1*r*.

In the example shown, each connecting segment 41 of a tooth 4 extends in an inclined manner in the plane perpendicular to the main plane P and defined by the main direction X and the lateral direction Z. Each connecting segment 41 of a tooth 4 is extended by an end segment 4*e* extending parallel to the main direction X and provided at its end, on the front face, with the pointed distal portion 4*p*. It should be noted that the rear face 4*b* of the end segment 4*e* of the tooth is located in a plane which is substantially coplanar with the reverse face 1*v* of the comb. Preferably, a chamfer 4*c* is arranged on the rear face 4*b* of the end segment 4*e* of each tooth 4, from the free end of this end segment, to facilitate the operation of extracting the plugs, as this is better understood in the following description.

According to another characteristic of the invention, the comb 1 comprises a separation system 8 allowing to ensure complete separation between each tooth 4 and the plug 2 seized by the pointed distal portion 4*p* of these teeth. This separation system 8 comprises at least one control and in the example illustrated, two controls 11*a*, 11*b* to move fingers 12 engaged between the teeth 4 and adapted to exert a force on the plugs 2 to detach them from the teeth 4.

In accordance with the invention, the separation system 8 comprises a slide 13 returned elastically and guided to slide with respect to the body 7 in a direction parallel to the direction of extension of the teeth 4, that is to say the main direction X. This slide 13 is provided with fingers 12 and controls 11*a*, 11*b*, which when pressed to move translationally causes the fingers 12 to slide in the direction of the pointed distal portions 4*p* in order to eject the plugs 2 from the teeth 4. The slide 13 is therefore capable of occupying a first position called rest position for which no force is exerted on the controls 11*a*, 11*b* and a second position called ejection position for which pressing one and/or the other of the controls 11*a*, 11*b* leads to the expulsion of the plugs 2 from the teeth 4.

According to an advantageous variant embodiment, the slide 13 is made in the form of a flat plate 13*a* assembled with the body 7 and forming the first portion 1*a* of the comb. This plate 13*a* of the slide delimits by its external face, a main face of the comb, namely the back face 1*v*. It should be noted that the plate 13*a* of the slide is provided with a stretch-flange 13*t* extending along the two lateral sides 1*l* and the proximal side 1*p* of the comb. The plate 13*a* of the slide also has a hole delimiting the aperture 5 of the comb and having an adapted dimension to allow the positioning of the support return 7*r* of the body and the sliding of the slide 13 with respect to the body 7.

This plate 13*a* of the slide is provided with a row of fingers 12 projecting into the second portion 1*b* of the comb in directions of extension parallel to each other and to the main direction X. The plate 13*a* of the slide is therefore extended opposite the proximal side 1*p*, by the fingers 12 positioned from the distal side 1*d*, in a linear direction parallel to the transverse direction Y. The fingers 12 are spaced apart from each other to be engaged between the teeth 4. More precisely, the fingers 12 of the slide are engaged between the flat lateral faces 4*i* of the teeth 4. Advantageously, the fingers 12 are guided to slide with clearance, between the teeth 4. Each finger 12 projects from the distal side of the plate 13*a* in a direction parallel to the main direction X. It should be noted that the fingers 12 are set back from the distal end of the teeth 4 when the slide 13 is in its rest position (FIGS. 1, 2, 4 and 5) while in the ejection position, the fingers 12 extend substantially to the pointed distal portions 4*p* of the teeth 4 (FIGS. 6 and 7E).

Each finger 12 has a front face 12*i* and on the opposite side, a rear face 12*j* facing the same side respectively as the recto face 1*r* and the back face 1*v*. Each finger 12 comprises a segment 12*a* for connection to the plate 13*a* of the slide, extending in a direction parallel to the main direction X. This connecting segment 12*a* is connected by an intermediate segment 12*b* which extends in a direction parallel to the main direction X, by a pushing segment 12*c*, the free end or edge of which is intended to be supported against the plug 2 to disengage it from the teeth 4.

Preferably, each intermediate segment 12*b* from the plate 13*a* of the slide in the opposite direction of the recto face 1*r* so that the pushing segment 12*c* is set back from the recto face 1*r*. Advantageously, the rear face of the pushing segment 12*c* of the fingers 12 is located in a plane extending coplanar to the rear face 4*b* of the teeth 4 of the comb.

The slide 13 is guided to slide by the body 7 in the main direction X using a sliding guide system 15 of any type known per se. In the preferred exemplary embodiment illustrated in the drawings, the sliding guide system 15 comprises oblong-shaped slots 7*l* arranged for example in the stretch-flanges 7*t* of the body 7 and in which are engaged sliding lugs 13*p* extending in projection from the stretch-flanges 13*t* of the slide 13. The slide 13 and the body 7 are assembled together by the engagement, by elastic deformation, of the sliding lugs 13*p* inside the slots 7*l*.

The translational movement of the slide 13 is ensured by one and/or the other of the controls 11*a*, 11*b*. Advantageously, the slide 13 is equipped with controls 11*a*, 11*b* which are arranged on the slide 13 in order to be easily operated by the operator.

Each control 11*a*, 11*b* of the slide 13 is advantageously accessible from the first portion 1*a* of the comb so as to avoid contamination of the operator when the control is actuated. According to an advantageous variant embodiment, the slide 13 comprises, as a control, a pressing button 11*a* accessible from the proximal side 1*p* of the first portion 1*a* of the comb. Preferably, this pressing button 11*a* is located in a corner of the proximal side 1*p* and more precisely in the upper right corner when the comb is seen from its recto face 1*r*, with its teeth 4 positioned horizontally. Thus, as emerges more precisely from FIGS. 1, 2 and 4, this pressing button 11*a* is arranged projecting from the plate 13*a* of the slide to extend over a portion of the proximal side 1*p* and the lateral side 1*l*. It should be noted that the plate 7*a* of the body 7 has a cutout 7*d* for housing the pressing button 11*a*.

According to an additional characteristic, the slide 13 comprises, as a control, a support rib 11*b* rising from the back face 1*v* and located between the aperture 5 and the proximal side 1*p* of the first portion 1*a* of the comb. The slide 13 can be moved in translation from its rest position to its ejection position, by a force exerted at the proximal side of the comb and/or the back face of the comb.

According to an advantageous embodiment characteristic, the slide 13 is returned elastically, to switch, when the pressing force on the controls 11*a*, 11*b* is removed, from the ejection position to the rest position. The slide 13 automatically returns to its rest position via an elastic return system 17 of any type known per se. According to the example illustrated more precisely in FIGS. 5 and 6, the elastic return system 17 comprises a flexibly deformable blade 17*a*, one end of which is connected to the slide 13 in a direction parallel to the transverse direction Y. The other end of this deformable blade 17*a* is supported on a stop 7*b* adjoining the body 7 so that it undergoes the force to be returned to the slide 13 during the sliding movement of the slide in the main direction X. At the end of its movement travel, the slide 13 is biased by a return force bringing it back to its rest position.

According to an advantageous embodiment characteristic, the comb 1 is provided with an end-of-travel stop for the slide 13 limiting its sliding to a position corresponding to the ejection position of the plugs. This end-of-travel stop can be made in any suitable way. This end-of-travel stop can be made, for example, by the bottoms of the openings 7*l* on which the sliding lugs 13*p* of the slide abut or by the cutout 7*d* on which the pressing button 11*a* comes into contact.

According to the embodiment illustrated in the drawings, the comb 1 according to the invention comprises two parts assembled together, namely the body 7 and the slide 13. The comb 1 according to the invention is of simple and inexpensive design. Of course, the comb 1 can be made in a different way, such as in the form, for example, of a flat case in which the slide 13 is guided to slide.

The use of the comb 1 according to the invention is relatively simple and follows directly from the preceding description.

The comb 1 illustrated in the drawings is provided with eight teeth 4 so that the comb can be used to simultaneously handle from one to eight plugs 2 each closing a tube 3. Typically, these tubes 3 are held in position in a support so as to be spaced apart and arranged in a linear manner. In the example illustrated in FIG. 7A, the tubes 3 and consequently the plugs 2 are aligned parallel to the transverse direction Y, with a spacing pitch corresponding to the spacing pitch between the teeth 4 of the comb 1.

The operator who takes the comb 1 with one hand by its first portion 1*a*, positions it to orient the teeth 4 in a direction parallel to the transverse direction Y and in a position such that one tooth 4 is located directly above each plug 2 to be removed (FIG. 7A). The operator then engages the teeth 4 inside the cavities 2*b* of the plugs 2 to ensure that the plugs are taken by the pointed distal portions 4*p* of the teeth. It should be noted that the engagement of the pointed distal portions 4*p* of the teeth 4 in the wall 2*c* of the plugs can be facilitated if the comb occupies, relative to the vertical plane, an inclined position (movement M1) as illustrated in FIG. 7B. Such an inclined position of the comb allows the engagement of the teeth 4 inside the cavities 2*b* of the plugs while allowing the insertion of a portion of the plugs in the clearances 9 provided by the teeth 4.

The operator then applies a pivoting movement to the comb according to a movement M2 of vertical straightening and tilting beyond the vertical plane and in a direction perpendicular to the main plane P (FIG. 7C). Such a pivoting movement combined with a lifting movement of the comb allows to disengage the plugs 2 which are attached to the teeth 4 from the tubes 3 (FIG. 7D). This plug extraction operation is carried out effortlessly since the rotational movement of the comb acts as a lever effect.

The plugs 2 are hooked onto the teeth 4 of such a comb which can be moved to be positioned above a collection receptacle 18 (FIG. 7E). To release the plugs 2, the operator presses with at least one finger on the control 11*a* and/or 11*b* to move the slide 13 in translation, whose fingers 12 of the slide provide a pressing on the plugs 2 leading to their complete separation from the teeth 4. The plugs 2 are automatically and simultaneously ejected from the comb 1 to be collected in the collection receptacle 18.

The gripping of the comb 1 for its use can be carried out in different ways. According to a preferred example, the first portion 1*a* of the comb is taken by a hand of the operator whose fingers apart from the thumb are engaged through the aperture 5 so that the first portion 1*a* of the comb located between this aperture 5 and the proximal side 1*p* is supported, on the back face 1*v* with the palm of the hand and, on the recto face, with the four folded fingers of the operator's hand. The proximal side 1*p* of the comb can be supported on the palm of the hand. According to this type of gripping, the thumb of the hand of the operator who has the comb in his hand, can easily press the pressing button 11*a* of the slide located in the upper rear corner of the comb, to ensure the separation of the plugs from the teeth.

According to a different grip of the comb, the thumb of the operator is supported on the recto face 1*r* while the other four fingers of the operator's hand are supported on the back face 1*v*, considering that the proximal side 1*p* can be supported on the palm of the hand. The sliding of the slide 13 can be obtained by a force exerted by the fingers on the support rib 11*b* and/or the pressing button 11*a*.

The invention claimed is:

1. A tool for manipulating a plurality of plugs spaced apart and arranged in a linear manner, each having an upper surface with a cavity, the tool taking the form of a comb including two main faces extending on either side of a main plane and having a first portion adapted for handling by an operator and a second portion adapted for taking the plugs when applying to the first portion, a pivoting movement perpendicular to the main plane, the tool comprising:

- a body provided with a row of teeth projecting from the second portion of the comb in directions of extension parallel to each other and spaced apart in a linear direction in order to be intended to engage with the cavities of the plugs; and
- a separation system for separating the plugs from the teeth comprising a control for moving fingers of the comb engaged between the teeth;

wherein:

- the two main faces extend along the main plane from a proximal end to a distal end, the row of teeth are disposed on the distal end, and the control is disposed closer to the proximal end than the distal end;
- the teeth include pointed distal portions oriented in directions perpendicular to the main plane of the comb, to be intended to engage in the plugs during the pivoting movement;
- the separation system comprises a slide configured to be returned elastically and guided to slide with respect to the body in a direction parallel to the direction of extension of the teeth, the slide including the fingers of the comb, which are movable by sliding between the teeth; and
- the control is accessible from the first portion of the comb and is configured to be pressed in a direction parallel to the main plane to move translationally to cause the fingers of the comb to slide in the direction of the pointed distal portions in order to eject the plugs from the teeth.

2. The tool according to claim 1, wherein the first portion of the comb comprises an aperture which opens onto the two main faces, the aperture being arranged at a distance from the proximal end of the first portion of the comb to ensure the passage of the operator's fingers for gripping the tool.

3. The tool according to claim 2, wherein the control of the slide is located between the aperture and the proximal end of the first portion of the comb.

4. The tool according to claim 1, wherein the control of the slide is accessible from the proximal end of the first portion of the comb.

5. The tool according to claim 1, wherein the first portion of the comb has a rectangular shape, being delimited by two lateral sides connected to the proximal end, the control of the slide being located in a corner of the proximal end.

6. The tool according to claim 1, wherein the body takes the form of a plate externally delimiting a main face of the two main faces of the comb and slidably guiding the slide made in the form of a plate externally delimiting another main face of the two main faces of the comb.

7. The tool according to claim 1, wherein the body is provided with a flexibly deformable blade an end of which is supported on the slide so that the slide is biased by a return force during sliding travel thereof.

8. The tool according to claim 1, wherein the pointed distal portion of each tooth is connected to the body by a connecting segment delimiting a clearance space for the engagement of the pointed distal portions in the plugs.

9. The tool according to claim 1, wherein the pointed distal portion of each tooth has a rear face extending coplanarly with a rear face of the fingers of the comb.

10. A method for manipulating a plurality of plugs, the method comprising:

providing at least a series of tubes spaced apart and arranged in a linear manner and each closed by a plug having an upper surface with a cavity;

providing the tool according to claim 1, which takes the form of the comb;

taking the comb by the first portion with one hand;

engaging the teeth inside the cavities of the plugs to ensure that the plugs are taken by the pointed distal portions of the teeth;

applying a pivoting movement to the comb in a direction perpendicular to the main plane to release the plugs from the tubes;

and ensuring by at least one finger of the operator, a support in translation on the control of the slide in order to eject the plugs from the teeth.

* * * * *